United States Patent

Yoshioka et al.

Patent Number: 5,357,373
Date of Patent: Oct. 18, 1994

[54] IMAGE PROJECTION LENS

[75] Inventors: Takayuki Yoshioka; Akira Nitta, both of Tokyo, Japan

[73] Assignee: Pioneer Electronic Corporation, Tokyo, Japan

[21] Appl. No.: 76,470

[22] Filed: Jun. 14, 1993

[30] Foreign Application Priority Data

Jun. 15, 1992 [JP] Japan ................... 4-155453

[51] Int. Cl.$^5$ .................... G02B 13/18; G02B 9/60
[52] U.S. Cl. .................... 359/649; 359/714; 359/764
[58] Field of Search ............ 359/649, 714, 764

[56] References Cited

U.S. PATENT DOCUMENTS 4,792,217 12/1988 Yoshioka .................... 359/764

Primary Examiner—Loha Ben
Assistant Examiner—Evelyn A. Lester
Attorney, Agent, or Firm—Kane, Dalsimer, Sullivan, Kurucz, Levy, Eisele and Richard

[57] ABSTRACT

A projection lens has a five-group structure, in which a first-group lens is a positive lens, a second-group lens is a negative lens, third- and fourth-group lenses are respectively positive lenses, and a fifth-group lens is a negative lens. The projection lens has a half view angle of 34° or greater, and satisfies the following conditions: $0.04 < d_4/f_0 < 0.08$, $0.2 < \phi_1 < 0.9$, $-0.6 < \phi_2 < 0$, $0.7 < \phi_3 < 1.0$, $0 < \phi_4 < 0.5$, and $-1.36 < \phi_5 < -0.6$, where: $f_0$: focal distance of the overall system, $d_4$: on-axis interval between the second-group lens and the third-group lens, $\phi_1$: power of the first-group lens, $\phi_2$: power of the second-group lens, $\phi_3$: power of the third-group lens, $\phi_4$: power of the fourth-group lens, and $\phi_5$: power of the fifth-group lens, (where $\phi_1$–$\phi_5$ are respectively values obtained when the optical power of the overall system is set to 1).

12 Claims, 7 Drawing Sheets

IMAGE PROJECTION LENS

BACKGROUND OF THE INVENTION

1. Field of the Invention

The present invention relates to an image projection lens suitably used for a projection television set.

2. Description of the Prior Art

A three-tube type color projection television set includes a red (R) projection tube, a green (G) projection tube and a blue (B) projection tube, and image projection lenses provided for the respective lenses. Images projected by the three tubes are focused on a screen by means of the respective projection lenses. Such a three-tube color projection television set is capable of providing a large screen having a size equal to or greater than 200 inches, and hence becomes applied to not only business use but also home use.

The three-tube type color projection television set having the above features is required to have a large angle of view, and a large aperture ratio and a good imaging performance of a projection lens used for the purpose of thinning and down-sizing of the television set.

Conventionally, various projection lenses have been proposed. For example, a projection lens is made of only glass in order to keep high processing accuracy and good quality. A projection lens made of only plastic material is less expensive and has a large aperture ratio. Some types of the projection lens are proposed in U.S. Pat. Nos. 4,776,681, 4,792,217 and 4,761,063. Further, a hybrid-type projection lens is known in which a glass lens and an aspherical plastic lens are used. As disclosed in Japanese Laid-Open Patent Publication No. 60-175019, a CRT projection tube has an aspherical glass surface in order to compensate for curvature of field and prevent a decrease in the imaging performance.

However, the conventional projection lens including a glass lens has a disadvantage in that it is expensive to improve the imaging performance while keeping a large aperture ratio and that the performance of a peripheral part of the lens deteriorates more greatly as the distance from the axis of the projection lens increases. The conventional projection lens including three plastic lenses respectively having aspherical surfaces has a large aperture but does not have a processing accuracy as good as that of glass lenses. Hence, it is very difficult to produce glass projection lenses having designed performance. Further, the refractive index and the shape of plastic lenses change due to temperature change. This changes the focal distance and degrades the imaging performance. In the markets, it is desired to facilitate thinning and down-sizing of the projection television sets and to reduce the optical path length between the CRT and the screen and increase the angle of view of the projection lenses.

SUMMARY OF THE INVENTION

It is an object of the present invention to provide a projection lens having a large angle of view and high imaging performance and having a little temperature dependence.

According to one aspect of the present invention, there is provided a projection lens including a five-group structure including a first-group positive lens, a second-group negative lens, a third-group positive lens, a fourth-group positive lens, and a fifth-group negative lens arranged in this order from a screen side. Each of the first-group lens and the second-group lens is a lens having at least one aspherical surface. Either the third-group lens or the fourth-group lens is a lens having at least one aspherical surface. The fifth-group lens is a lens having a concave surface facing the screen side. Further, the projection lens has a half angle of view equal to or greater than 34°, and satisfies the following conditions (a)–(f):

(a) $0.04 < d_4/f_0 < 0.08$
(b) $0.2 < \phi_1 < 0.9$
(c) $-0.6 < \phi_2 < 0$
(d) $0.7 < \phi_3 < 1.0$
(e) $0 < \phi_4 < 0.5$
(f) $-1.36 < \phi_5 < -0.6$ where:
  $f_0$: focal distance of the overall system
  $d_4$: on-axis interval between the second-group lens and the third-group lens
  $\phi_1$: power of the first-group lens
  $\phi_2$: power of the second-group lens
  $\phi_3$: power of the third-group lens
  $\phi_4$: power of the fourth-group lens
  $\phi_5$: power of the fifth-group lens
  (where $\phi_1$–$\phi_5$ are values obtained when the optical power of the overall system is set to 1).

The first-group lens, the third-group lens and the fourth-group lens are used to obtain a positive power. The first-group lens and the fifth-group lens function to correct a distortion aberration. The fifth lens is a concave lens having a concave surface facing the screen side and having at least one aspherical lens. Hence, the fifth lens functions to correct astigmatism or distortion aberration and reduce the Petzval's sum to thereby correct a curvature of field.

The second-group lens, which is a negative lens having at least one aspherical surface, and the first-group lens function to cancel variations in the refractive indexes of the first- and second-group lenses and to thereby reduce a variation in the focal distance due to temperature change. The second-group lens has the important function of correcting the most of the spherical aberration, astigmatism and the coma-aberration depending on the aperture of the projection lens system, so that these aberrations are substantially reduced to zero. Further, the second-group lens cooperates with the fifth-group lens and reduces the Petzval's sum to thereby correct a curvature of field.

The fourth-group lens has the main function of correcting coma-aberration in a peripheral portion thereof, so that astigmatism which is not completely corrected by the fifth-group lens can be corrected. Further, the fourth-group lens has the other function of correcting the spherical aberration. As has been described previously, the half angle of view of the projection lens is equal to or greater than 34°.

According to another aspect of the present invention, there is provided a projection lens used in combination with a cathode ray tube positioned closely adjacent to the faceplate of the cathode ray tube.

The first-group lens includes a meniscus shaped element of positive optical power at the optical axis of the projection lens, the second-group lens includes a meniscus shaped element of negative optical power for correcting most of spherical aberration, astigmatism and coma-aberration depending on aperture of the projection lens, at least on surface of the second-group lens being aspherical surface.

The first-group lens and the second-group lens cooperatively cancel variations in refractive indexes of the first- and second-group lens.

The third-group lens includes a biconvex element for supplying the majority of the positive optical power of the projection lens.

The fourth-group lens includes a meniscus shaped element of positive optical power for mainly correcting coma-aberration in a peripheral portion of the projection lens.

The fifth-group lens includes a meniscus shaped concave lens having concave surface oriented to the screen side. The fifth-group lens decreases Petzval's sum to correct a curvature of field in cooperation with the second-group lens.

With the above-mentioned structure of the projection lens, it becomes possible to improve the angle of view and performance and to suppress deterioration due to temperature change.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

A description will now be given of an embodiment of the present invention.

Figure 1:
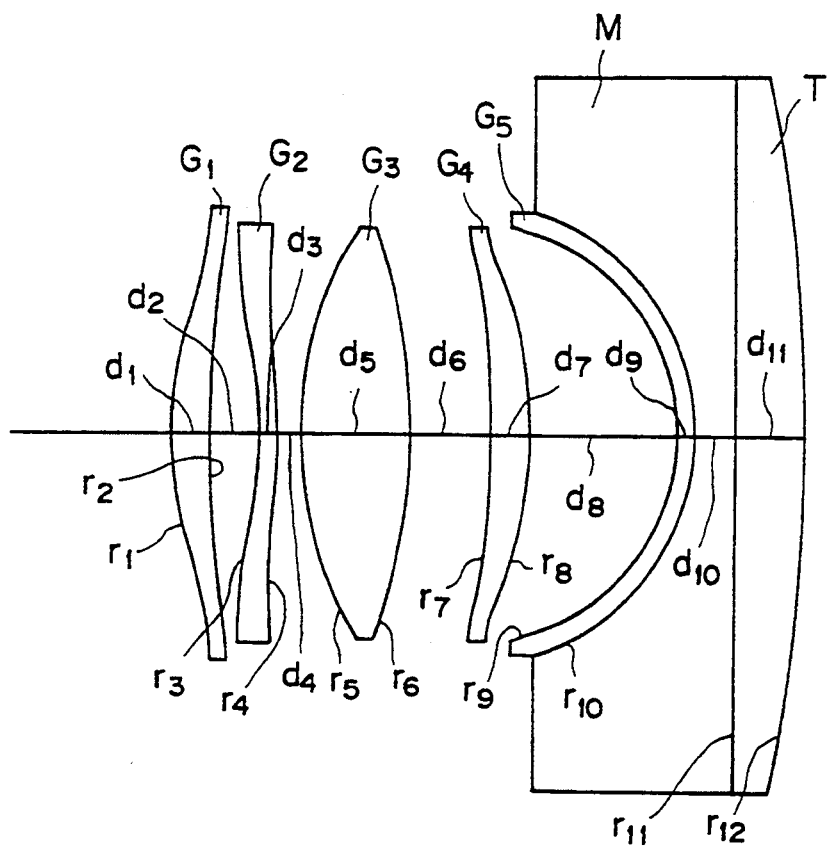
FIG. 1 is a diagram illustrating an overview of an embodiment of a projection lens according to the present invention.

A projection lens shown in FIG. 1 is made up of a first-group positive lens $G_1$, a second-group negative lens $G_2$, a third-group positive lens $G_3$, a fourth-group positive lens $G_4$, and a fifth-group negative lens $G_5$.

Each of the first-group lens $G_1$ and the second-group lens $G_2$ is a plastic lens having at least one aspherical surface. The first-group lens $G_1$ is a positive lens, and the second-group lens $G_2$ is a negative lens.

A ratio $(dN/dT)_1$ of a refractive index N of the first-group lens $G_1$ to temperature and a ratio $(dN/dT)_2$ of a refractive index N of the second-group lens $G_2$ to temperature satisfy the following conditions:

$$(dN/dT)_1 < -1.0 \times 10^{-4}$$

$$(dN/dT)_2 < -1.0 \times 10^{-4}.$$

When the refractive index/temperature ratio $(dN/dT)_1$ of the first-group lens $G_1$ and the refractive index/temperature ratio $(dN/dT)_2$ of the second-group lens $G_2$ satisfy the above conditions, a variation in the refractive index N of the first-group lens $G_1$ (positive lens) due to temperature change and a variation in the refractive index N of the second-group lens $G_2$ (negative lens) due to temperature variation are canceled, and hence a fluctuation of the focal position due to temperature variation can be reduced.

In order to satisfy the above-mentioned conditions upon the refractive index/temperature ratio $(dN/dT)_1$ of the first-group lens $G_1$ as well as the refractive index/temperature ratio $(dN/dT)_2$ of the second-group lens $G_2$, it is necessary to form the first-group lens $G_1$ which is a convex lens of a material having a refractive index/temperature ratio $(dN/dT)_1$ of $-1.0 \times 10^{-4}$ or less and to form the second-group lens $G_2$ which is a concave lens of a material having a refractive index/temperature ratio $(dN/dT)_2$ of $-1.0 \times 10^{-4}$ or less. Such a material is, for example, acrylate resin or polystyrene.

Each of the third-group lens $G_3$ and the fourth-group lens $G_4$ is a positive lens, and at least either the third-group lens or the fourth-group lens $G_4$ has at least one aspherical surface.

The fifth lens $G_5$ is a negative lens having a concave surface facing the screen side, and may be a spherical lens or a lens having at least one aspherical surface. The fifth-group lens $G_5$ which is a spherical lens may be made of glass or plastic.

The half angle of view of the projection lens made up of the above-mentioned groups of lenses is required to be 34° or more, and satisfies the aforementioned conditions (a)–(f).

Figure 2:
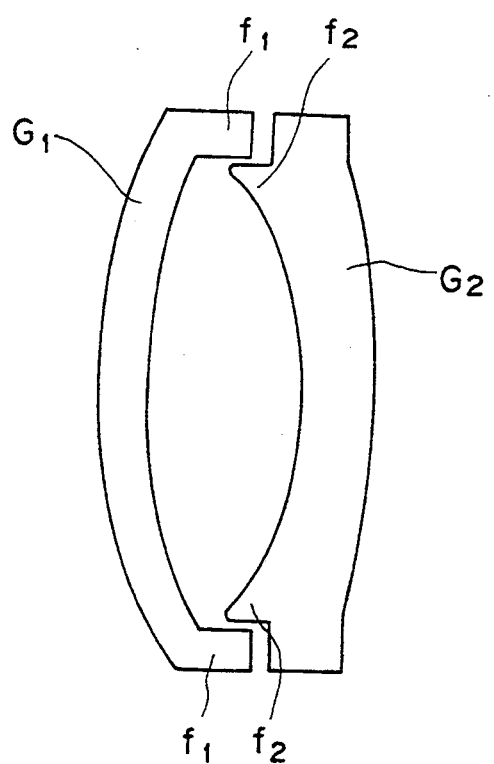
FIG. 2 is a diagram illustrating the relationship between a first-group lens and a second-group lens in the projection lens according to the present invention.

More particularly, the condition (a) relates to a ratio $d_4/f_0$ of the on-axis interval $d_4$ between the second-group lens $G_2$ and the third-group lens $G_3$ to the focal distance $f_0$ of the overall system. Normally, the ratio $d_4/f_0$ is greater than 0.04 and less than 0.08 ($0.04 < d_4/f_0 < 0.08$). It is required that the relative position relation between the first-group lens $G_1$ and the second-group lens $G_2$ takes into account the interval of the lens surfaces, decentering and inclination of the lenses. In order to enhance the accuracy of the these matters to be considered, it is necessary to maintain this accuracy at flange portions of the first-group lens $G_1$ and the second-group lens $G_2$ as illustrated in FIG. 2. When the ratio $d_4/f_0$ of the on-axis interval $d_4$ between the second-group lens $G_2$ and the third-group lens $G_3$ to the focal distance $f_0$ of the overall system is 0.04 or less, the relative interval between the first-group lens $G_1$ and the second-group lens $G_2$ increases. Hence, high accuracy in the coupling of these lenses may not be obtained, and it become difficult to couple these lenses. Further, the second-group lens $G_2$ and the third-group lens $G_3$ becomes close to each other, and hence it becomes difficult to assemble the projection lens. On the other hand, when the ratio $d_4/f_0$ is 0.08 or greater, the coma-aberration increases and it becomes difficult to increase the angle of view.

The condition (b) relates to the power $\phi_1$ of the first-group lens $G_1$. Normally, the power $\phi_1$ is such that $0.2<\phi_1<0.9$, preferably, $0.2<\phi_1<0.5$. When the power $\phi_1$ is equal to or less than 0.2, it is necessary to increase the powers of the third-group lens $G_3$ and the fourth-group lens $G_4$, these powers being positive as in the case of the first-group lens $G_1$. Hence, the spherical aberration is increased and it becomes difficult to increase the aperture ratio. When the power $\phi_1$ is 0.9 or greater, the abaxial aberration is degraded and it becomes difficult to increase the angle of view.

The condition (c) relates to the power $\phi_2$ of the second-group lens $G_2$. Normally, the power $\phi_2$ is such that $-0.6<\phi_2<0$, preferably $-0.3<\phi_2<-0.1$. When the power $\phi_2$ of the second-group lens $G_2$ is equal to 0.6 or less, it is necessary to increase the thickness of the first-group lens $G_1$ to hence increase the power $\phi_1$. This increases the time necessary to perform a cooling step in a process for producing the first-group lens $G_1$ made of plastic, and makes it difficult to produce the first-group lens $G_1$ by means of a mold. Alternatively, when the power $\phi_2$ of the second-group lens $G_2$ is 0 or greater, sufficient correction for temperature change cannot be obtained.

The condition (d) relates to the power $\phi_3$ of the third-group power $G_3$. Normally, the power $\phi_3$ is such that $0.7<\phi_3<1.0$, preferably $0.8<\phi_3<0.9$. When the power $\phi_3$ of the third-group lens $G_3$ is equal to or less than 0.7, it is necessary to increase the thickness of the fourth-group lens $G_4$ in order to increase the power $\phi_4$ of the fourth-group lens $G_4$. This makes it difficult to produce the fourth-group lens $G_4$ made of plastic. Alternatively, when the power $\phi_3$ of the third-group lens $G_3$ is 1.0 or greater, the weight of the third-group lens $G_3$ increases, and the spherical aberration thereof increases. Hence, it becomes difficult to increase the aperture ratio.

The condition (e) relates to the power $\phi_4$ of the fourth-group lens $G_4$. Normally, the power $\phi_4$ is such that $0<\phi_4 0.5$, preferably $0.2<\phi_4<0.4$. When the power $\phi_4$ of the fourth-group lens $G_4$ is equal to or less than 0, it is difficult to correct the coma-aberration. Further, it is necessary to increase the powers of the first-group lens $G_1$ and the third-group lens $G_3$, these powers being positive as in the case of the fourth-group lens $G_4$. Hence, it becomes difficult to correct the spherical aberration and to increase the aperture ratio. This results in an increase of the production cost due to an increase in the thickness of the fourth-group lens $G_4$. Alternatively, when the power $\phi_4$ of the fourth-group lens $G_4$ is 0.5 or higher, it becomes difficult to correct the coma-aberration and the astigmatism. Furthermore, the distortion aberration increases and it becomes difficult to increase the angle of view.

The condition (f) relates to the power $\phi_5$ of the fifth-group lens $G_5$. Normally, the power $\phi_5$ is such that $-1.36<\phi_5<-0.6$. When the power $\phi_5$ of the fifth-group lens $G_5$ is $-1.36$ or less, the Petzval's sum is excessively decreased, and correction on the curvature of field becomes excessive. Alternatively, when the power $\phi_5$ of the fifth-group lens $G_5$ becomes equal to or higher than $-0.6$, the Petzval's sum is excessively increased, and correction on the curvature of field becomes insufficient.

In the five-group lens system satisfying the above conditions (a)-(f), an offset of the image forming surface caused by different wavelengths can be canceled when the Abbe's number $\nu_1$ of the first-group lens $G_1$, the Abbe's number $\nu_2$ of the second-group lens $G_2$ and the Abbe's number $\nu_3$ of the third-group lens $G_3$ satisfy $\nu_2<\nu_1$ and $\nu_2<\nu\nu_3$. Hence, it becomes possible to correct color aberration in addition to an increase in the view angle as well as the temperature compensation achieved when the conditions (a)-(f) are satisfied. It is also possible to correct the color aberration when the third-group lens $G_3$ is made up of two lenses stuck together and the Abbe's number $\nu_{3x}$ of one of the stuck lenses is 40 or less ($\nu_{3x}<40$). Hence, when the color aberration should be taken into account in the projection lens, it is necessary for the Abbe's numbers $\nu_1$, $\nu_2$ and $\nu_3$ to satisfy $\nu_2<\nu_1$ and $\nu_2<\nu_3$ or it is necessary for one of the lenses stuck together to satisfy $\nu_{3x}<40$. It is also possible for the above conditions to be concurrently satisfied. FIG. 2 illustrates a manner of coupling the first-group lens and the second group-lens. The first-group lens and the second-group lens include flange portions which do not constitute a part of the lens and the first-group lens and the second group-lens are coupled by the flange portions. As a result of coupling the lenses in this manner, optical paths of the two lenses are easily adjusted with each other.

Figure 5:
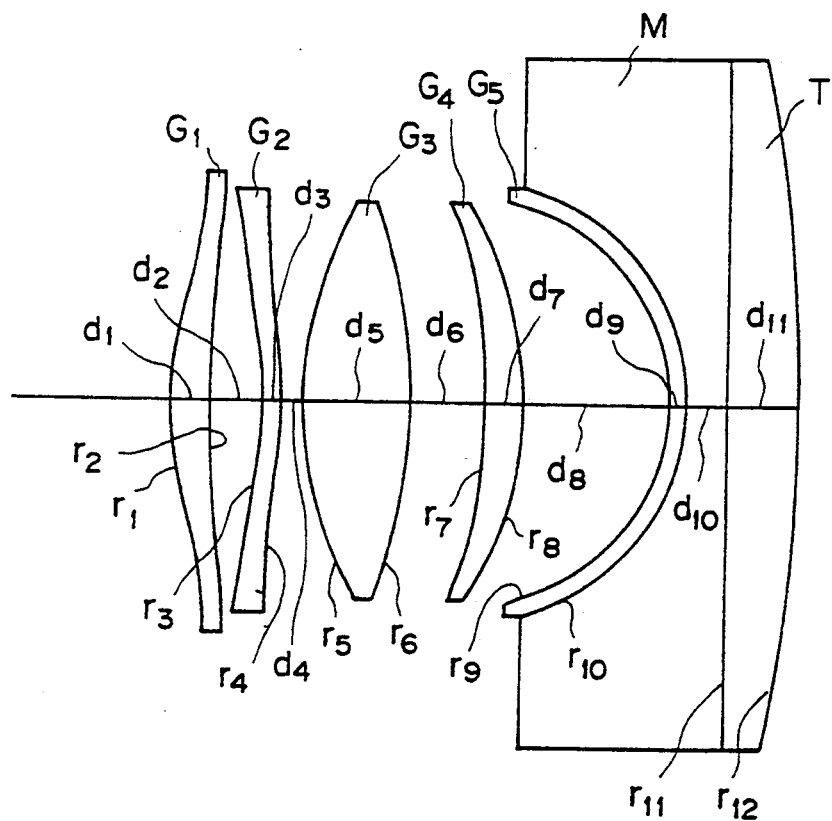
FIG. 5 is a diagram illustrating an overview of another structure of the projection according to the present invention.
Figure 8:
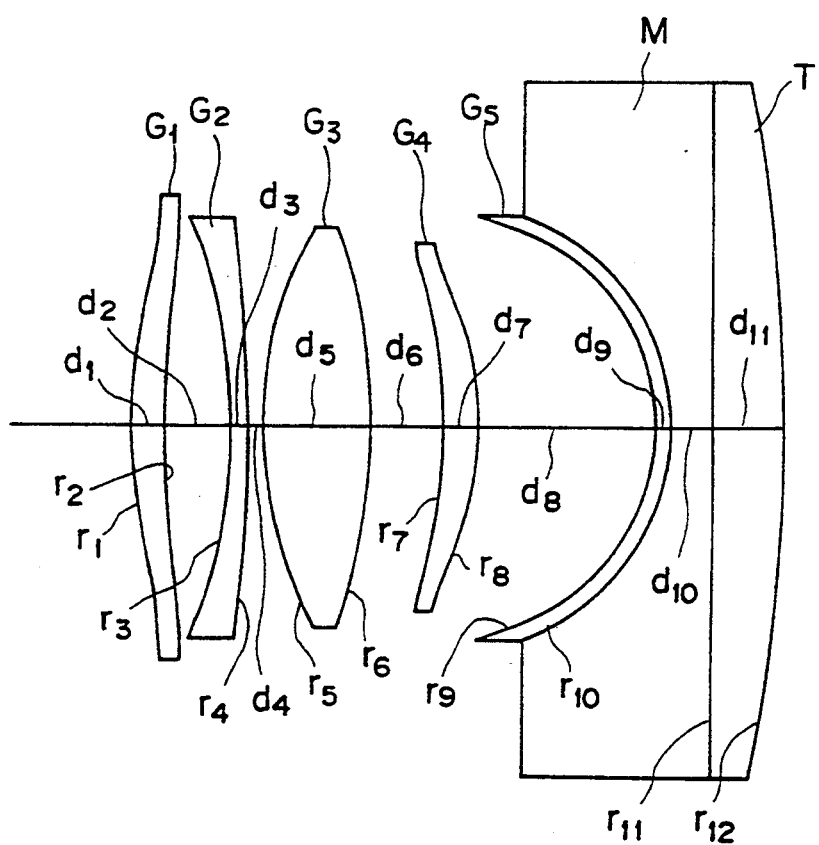
FIG. 8 is a diagram illustrating an overview of still another structure of the projection lens according to the present invention.

In FIGS. 1, 5 and 8, M indicates a liquid or a gel-phase filler for emitting or absorbing the heat of the cathode ray tube, and T indicates a projection tube glass. In the embodiments shown in FIGS. 1, 5 and 8, a surface $r_{11}$ of the cathode ray tube is a flat surface and the other surface $r_{12}$ is a convex fluorescent surface. The wider the angle of view becomes, the less the quantity of light in peripheral portion of the lens becomes. Therefore, the fluorescent surface of the cathode ray tube is arranged convex shape.

The projection lens having the above-mentioned structure has a wide view angle and high performance and little performance degradation due to temperature change. For example, the projection lens can suitably be applied to a projection television sets by being incorporated with a CRT projection tube of a spherical or aspherical'surface in which a concave surface of the fluorescent screen is oriented to the screen side. With the above projection lens, thinning and down-sizing of high-quality-image projection television sets.

A further description will now be given of the projection lens, using examples of experimental results. In the following experiment example, $r_1, r_2. \ldots, r_{12}$ respectively denote radii of curvature of the lenses and the projection tube surface glass, and $d_1, d_2, \ldots, d_{11}$ respectively denote the on-axis thicknesses and air intervals concerning the lenses and the projection tube surface glass. Further, $N_1, N_2, \ldots, N_{11}$ respectively denote the refractive indexes of the lenses and the air intervals with respect to the Fraunhofer's e-ray (having a wavelength of 546 nm). Furthermore, $\nu_1, \nu_2, \ldots, \nu_7$ respectively denote the Abbe's numbers of the lenses and the projection tube surface glass.

The shape of an aspherical surface is a rotation symmetry aspherical surface described in the following equations in rectangular coordinates in which the optical axis corresponds to the X axis:

$$X = (H^2/r)/\{1 + [1 - (k + 1)(H \div r)^2]^{\frac{1}{2}}\} +$$
$$A_4H^4 + A_6H^6 + A_8H^8 + A_{10}H^{10}$$
$$H = (Y^2 + Z^2)^{\frac{1}{2}}$$

where r denotes the paraxial curvature of an apex, k denotes a cone constant, and $A_4$, $A_6$, $A_8$ and $A_{10}$ respectively denote high-order aspherical constants. The units of the radii of curvature and the air intervals in the following figure data are "mm".

Experiment example 1:

The structure of the projection lens system is shown in FIG. 1.

---

$f_0$ (focal distance of the overall system) = 73.2
aperture ratio = 1.0 $d_4/f_0$ = 0.067
$\phi_1 = 0.36$  $\phi_2 = -0.18$  $\phi_3 = 0.80$
$\phi_4 = 0.33$  $\phi_5 = -0.77$
$(dN/dT)_1 = -1.2 \times 10^{-4}$
$(dN/dT)_2 = -1.2 \times 10^{-4}$

| | | | |
|---|---|---|---|
| $r_1 = 65.0935$ | $d_1 = 7.643$ | $N_1 = 1.49193$ | $\nu_1 = 58.04$ |
| $r_2 = 180.4744$ | $d_2 = 10.102$ | $N_2 = 1.00000$ | |
| $r_3 = -53.8844$ | $d_3 = 3.500$ | $N_3 = 1.49193$ | $\nu_2 = 58.04$ |
| $r_4 = -74.8391$ | $d_4 = 4.866$ | $N_4 = 1.00000$ | |
| $r_5 = 72.8160$ | $d_5 = 21.500$ | $N_5 = 1.51680$ | $\nu_3 = 64.20$ |
| $r_6 = -120.5622$ | $d_6 = 15.620$ | $N_6 = 1.00000$ | |
| $r_7 = -403.5096$ | $d_7 = 7.800$ | $N_7 = 1.49133$ | $\nu_4 = 58.45$ |
| $r_8 = -87.0411$ | $d_8 = 29.001$ | $N_8 = 1.00000$ | |
| $r_9 = -41.9562$ | $d_9 = 3.200$ | $N_9 = 1.49080$ | $\nu_5 = 58.18$ |
| $r_{10} = -45.0000$ | $d_{10} = 8.000$ | $N_{10} = 1.43828$ | $\nu_6 = 63.80$ |
| $r_{11} = \infty$ | $d_{11} = 14.100$ | $N_{11} = 1.55206$ | $\nu_7 = 57.00$ |
| $r_{12} = -350.0000$ | | | |

$r_1$: aspherical surface
k: 0.0000
$A_4$: $-0.139128 \times 10^{-5}$
$A_6$: $-0.704233 \times 10^{-9}$
$A_8$: $-0.234039 \times 10^{-12}$
$A_{10}$: $0.154546 \times 10^{-15}$ $r_2$: aspherical surface
k: 0.0000
$A_4$: $-0.975282 \times 10^{-6}$
$A_6$: $-0.728753 \times 10^{-9}$
$A_8$: $0.134770 \times 10^{-11}$
$A_{10}$: $-0.432777 \times 10^{-15}$ $r_3$: aspherical surface
k: 0.0000
$A_4$: $0.976069 \times 10^{-5}$
$A_6$: $-0.495042 \times 10^{-8}$
$A_8$: $0.222734 \times 10^{-11}$
$A_{10}$: $-0.0594013 \times 10^{-15}$ $r_4$: aspherical surface
k: 0.0000
$A_4$: $0.100671 \times 10^{-4}$
$A_6$: $-0.551495 \times 10^{-8}$
$A_8$: $0.130134 \times 10^{-11}$
$A_{10}$: $-0.138681 \times 10^{-15}$ $r_7$: aspherical surface
k: 0.0000
$A_4$: $-0.119785 \times 10^{-5}$
$A_6$: $0.933580 \times 10^{-9}$
$A_8$: $-0.186400 \times 10^{-11}$
$A_{10}$: $0.910699 \times 10^{-15}$ $r_8$: aspherical surface
k: 0.0000
$A_4$: $-0.292322 \times 10^{-6}$
$A_6$: $0.813352 \times 10^{-9}$
$A_8$: $-0.154755 \times 10^{-11}$
$A_{10}$: $0.840542 \times 10^{-15}$ $r_9$: aspherical surface
k: 0.0000
$A_4$: $-0.215669 \times 10^{-5}$
$A_6$: $0.282314 \times 10^{-9}$
$A_8$: $0.699156 \times 10^{-12}$
$A_{10}$: $-0.402743 \times 10^{-15}$

---

Figure 3:
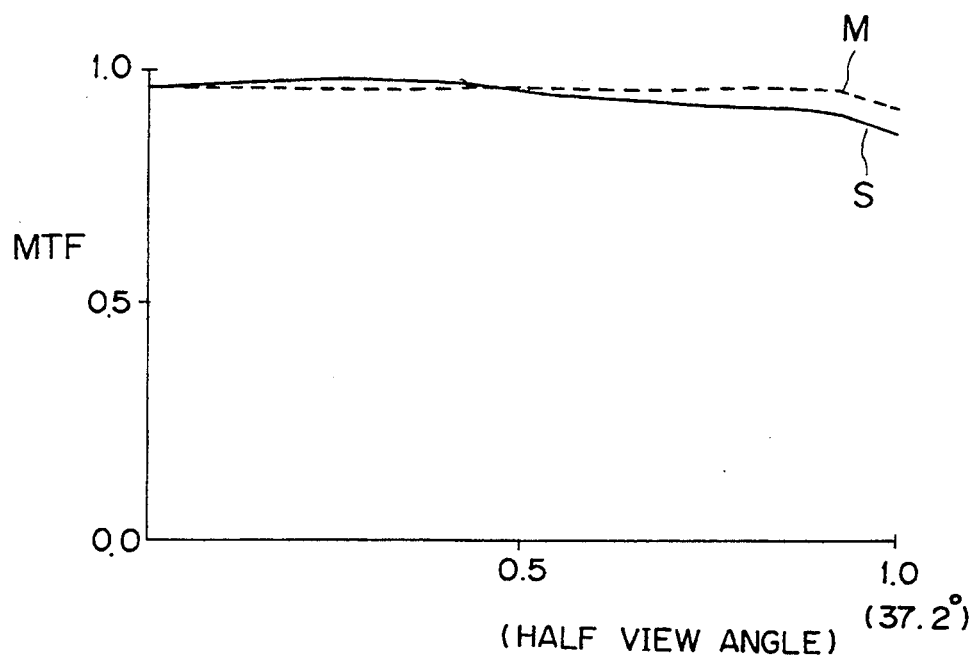
FIG. 3 is a graph of showing the MTF of experiment example 1.
Figure 4:
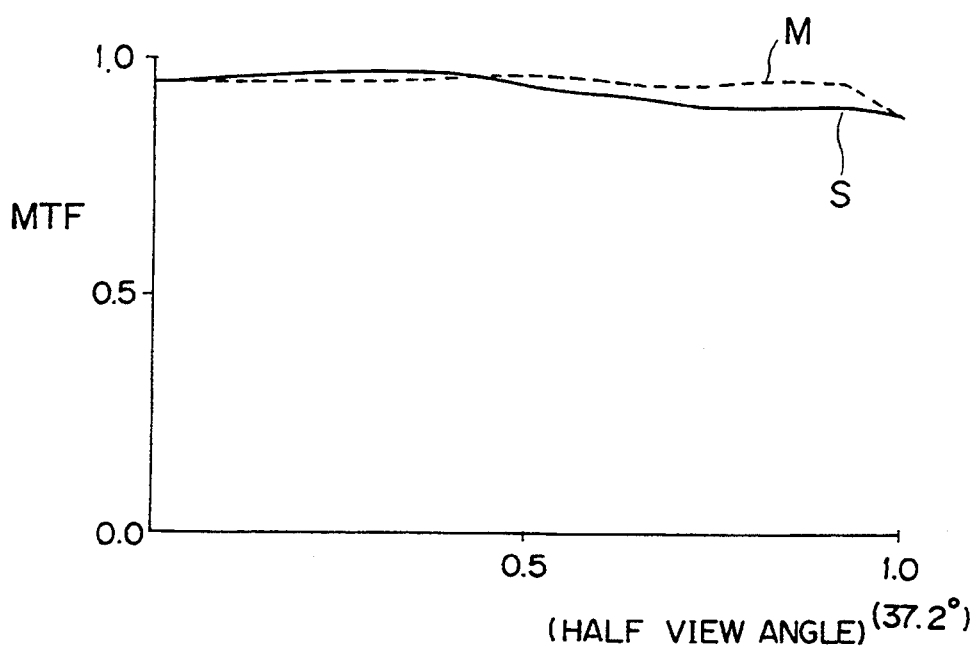
FIG. 4 is a graph of the MTF of the experiment example 1 with respect to temperature change.

The MTF (Modulation Transfer Function) with respect to the monochromatic light is shown in FIG. 3, and the MTF obtained when the environmental temperature is increased by 20° is shown in FIG. 4. In these figures, meridional (M) is indicated by the broken line, and sagittal (S) is indicated by the solid line.

Experiment example 2:

The structure of the projection lens system is shown in FIG. 5.

---

$f_0$ (focal distance of the overall system) = 73.4
aperture ratio = 1.0 $d_4/f_0$ = 0.061
$\phi_1 = 0.34$  $\phi_2 = -0.13$  $\phi_3 = 0.81$
$\phi_4 = 0.30$  $\phi_5 = -0.75$
$(dN/dT)_1 = -1.2 \times 10^{-4}$
$(dN/dT)_2 = -1.2 \times 10^{-4}$

| | | | |
|---|---|---|---|
| $r_1 = 68.3943$ | $d_1 = 7.800$ | $N_1 = 1.49193$ | $\nu_1 = 58.04$ |
| $r_2 = 180.9595$ | $d_2 = 11.242$ | $N_2 = 1.00000$ | |
| $r_3 = -57.8182$ | $d_3 = 3.500$ | $N_3 = 1.49193$ | $\nu_2 = 58.04$ |
| $r_4 = -75.1551$ | $d_4 = 4.470$ | $N_4 = 1.00000$ | |
| $r_5 = 74.5222$ | $d_5 = 21.500$ | $N_5 = 1.51680$ | $\nu_3 = 64.20$ |
| $r_6 = -113.1888$ | $d_6 = 14.799$ | $N_6 = 1.00000$ | |
| $r_7 = -222.4125$ | $d_7 = 7.800$ | $N_7 = 1.49133$ | $\nu_4 = 58.45$ |
| $r_8 = -78.4494$ | $d_8 = 28.991$ | $N_8 = 1.00000$ | |
| $r_9 = -42.6087$ | $d_9 = 3.200$ | $N_9 = 1.49080$ | $\nu_5 = 58.18$ |
| $r_{10} = -43.3000$ | $d_{10} = 8.000$ | $N_{10} = 1.43828$ | $\nu_6 = 63.80$ |
| $r_{11} = \infty$ | $d_{11} = 14.100$ | $N_{11} = 1.55206$ | $\nu_7 = 57.00$ |
| $r_{12} = -350.0000$ | | | |

$r_1$: aspherical surface
k: 0.0000
$A_4$: $-0.149191 \times 10^{-5}$
$A_6$: $-0.986419 \times 10^{-9}$
$A_8$: $0.168333 \times 10^{-12}$
$A_{10}$: $0.373579 \times 10^{-16}$ $r_2$: aspherical surface
k: 0.0000
$A_4$: $-0.129405 \times 10^{-5}$
$A_6$: $-0.163459 \times 10^{-9}$
$A_8$: $0.796934 \times 10^{-12}$
$A_{10}$: $-0.271788 \times 10^{-15}$ $r_3$: aspherical surface
k: 0.0000
$A_4$: $0.716201 \times 10^{-5}$
$A_6$: $-0.190939 \times 10^{-8}$
$A_8$: $0.326236 \times 10^{-13}$
$A_{10}$: $-0.2520131 \times 10^{-16}$ $r_4$: aspherical surface
k: 0.0000
$A_4$: $0.762027 \times 10^{-5}$
$A_6$: $-0.302943 \times 10^{-8}$
$A_8$: $-0.379605 \times 10^{-13}$
$A_{10}$: $0.177950 \times 10^{-15}$ $r_7$: aspherical surface
k: 0.0000
$A_4$: $-0.103445 \times 10^{-5}$
$A_6$: $0.200758 \times 10^{-9}$
$A_8$: $-0.135308 \times 10^{-11}$
$A_{10}$: $0.700033 \times 10^{-15}$ $r_8$: aspherical surface
k: 0.0000
$A_4$: $-0.208071 \times 10^{-6}$
$A_6$: $0.180075 \times 10^{-9}$
$A_8$: $-0.979593 \times 10^{-12}$
$A_{10}$: $0.540602 \times 10^{-15}$ $r_9$: aspherical surface
k: 0.0000
$A_4$: $-0.292544 \times 10^{-5}$
$A_6$: $0.628602 \times 10^{-9}$
$A_8$: $0.598399 \times 10^{-12}$
$A_{10}$: $-0.526793 \times 10^{-15}$

---

Figure 6:
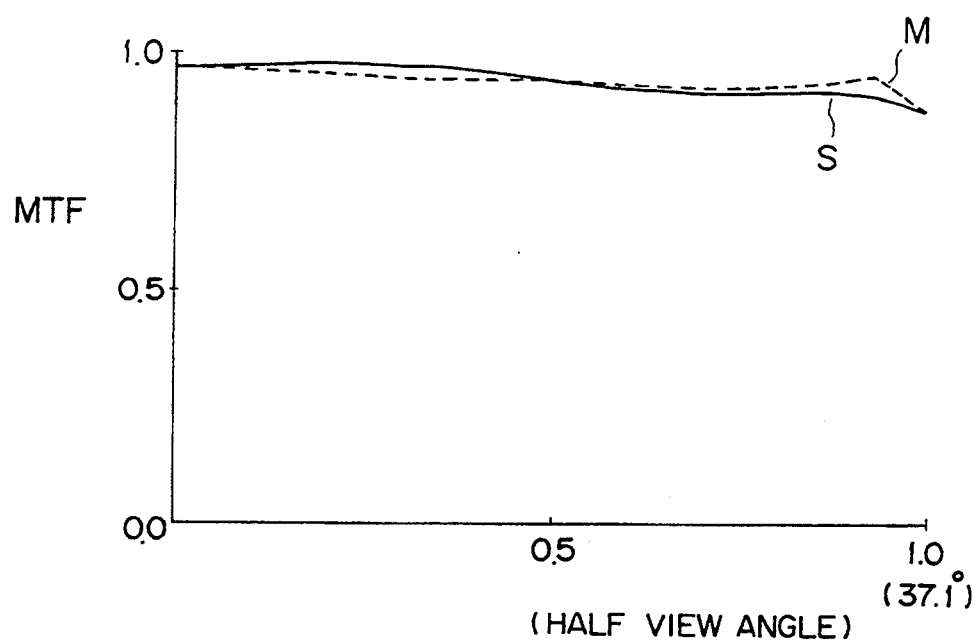
FIG. 6 is a graph of the MTF of experiment example 2.
Figure 7:
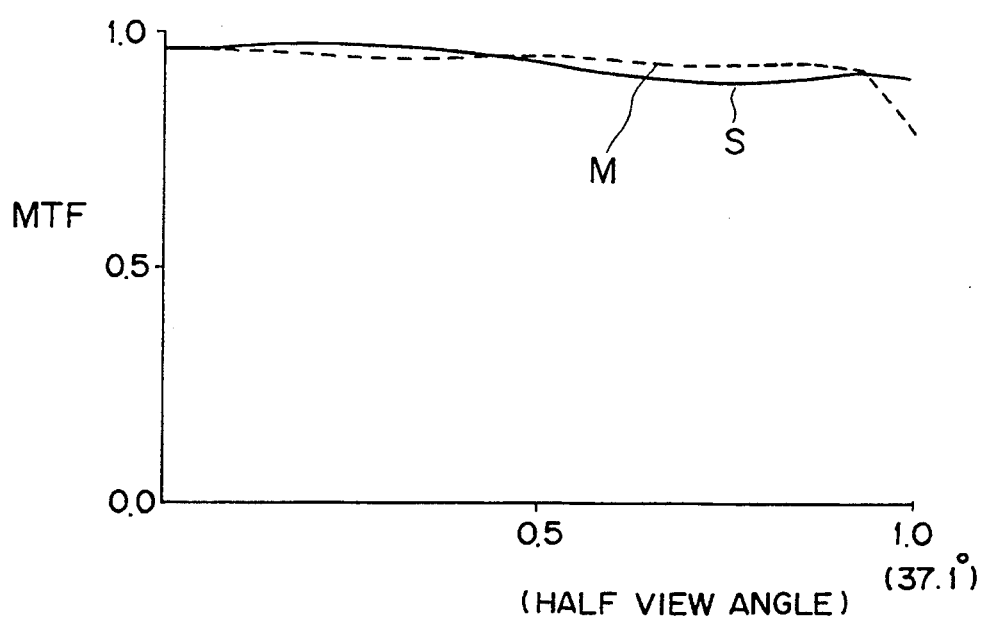
FIG. 7 is a graph of the MTF of experiment example 2 with respect to temperature change.

The MTF (Modulation Transfer Function) with respect to the monochromatic light is shown in FIG. 6, and the MTF obtained when the environmental temperature is increased by 20° is shown in FIG. 7. In these figures, meridional (M) is indicated by the broken line, and sagittal (S) is indicated by the solid line.

Experiment example 3:

The structure of the projection lens system is shown in FIG. 8.

---

$f_0$ (focal distance of the overall system) = 73.6
aperture ratio = 1.0 $d_4/f_0$ = 0.045
$\phi_1 = 0.24$  $\phi_2 = -0.16$  $\phi_3 = 0.88$
$\phi_4 = 0.29$  $\phi_5 = -0.67$
$(dN/dT)_1 = -1.2 \times 10^{-4}$
$(dN/dT)_2 = -1.2 \times 10^{-4}$

| | | | |
|---|---|---|---|
| $r_1 = 86.2652$ | $d_1 = 6.700$ | $N_1 = 1.49193$ | $\nu_2 = 58.04$ |
| $r_2 = 200.0000$ | $d_2 = 12.918$ | $N_2 = 1.00000$ | |
| $r_3 = -79.3914$ | $d_3 = 3.500$ | $N_3 = 1.49193$ | $\nu_2 = 58.04$ |
| $r_4 = -122.7043$ | $d_4 = 3.278$ | $N_4 = 1.00000$ | |
| $r_5 = 81.3717$ | $d_5 = 21.600$ | $N_5 = 1.58913$ | $\nu_3 = 61.25$ |
| $r_6 = -113.2159$ | $d_6 = 14.035$ | $N_6 = 1.00000$ | |
| $r_7 = -150.1902$ | $d_7 = 6.902$ | $N_7 = 1.49133$ | $\nu_4 = 58.45$ |
| $r_8 = -69.2083$ | $d_8 = 34.577$ | $N_8 = 1.00000$ | |
| $r_9 = -47.7897$ | $d_9 = 3.200$ | $N_9 = 1.49080$ | $\nu_5 = 58.18$ |
| $r_{10} = -44.0000$ | $d_{10} = 8.000$ | $N_{10} = 1.43828$ | $\nu_6 = 63.80$ |
| $r_{11} = \infty$ | $d_{11} = 14.100$ | $N_{11} = 1.55206$ | $\nu_7 = 57.00$ |
| $r_{12} = -350.0000$ | | | |

$r_1$: aspherical surface
k: 0.0000
$A_4$: $-0.157018 \times 10^{-5}$
$A_6$: $-0.269343 \times 10^{-9}$
$A_8$: $-0.112621 \times 10^{-12}$
$A_{10}$: $0.111875 \times 10^{-15}$ $r_2$: aspherical surface
k: 0.0000
$A_4$: $-0.600364 \times 10^{-6}$
$A_6$: $0.772052 \times 10^{-10}$
$A_8$: $0.831872 \times 10^{-13}$
$A_{10}$: $-0.485944 \times 10^{-16}$ $r_3$: aspherical surface
k: 0.0000
$A_4$: $0.530187 \times 10^{-5}$
$A_6$: $-0.336652 \times 10^{-8}$ $r_4$: aspherical surface
k: 0.0000
$A_4$: $0.553483 \times 10^{-5}$
$A_6$: $-0.423425 \times 10^{-8}$ -continued A$_8$: 0.254420 × 10$^{-12}$
A$_{10}$: 0.162868 × 10$^{-15}$
r$_7$: aspherical surface
k: 0.0000
A$_4$: −0.163531 × 10$^{-5}$
A$_6$: 0.100133 × 10$^{-8}$
A$_8$: −0.189549 × 10$^{-11}$ A$_8$: 0.873632 × 10$^{-12}$
A$_{10}$: 0.164097 × 10$^{-15}$
r$_8$: aspherical surface
k: 0.0000
A$_4$: −0.103979 × 10$^{-5}$
A$_6$: 0.216877 × 10$^{-8}$
A$_8$: −0.295327 × 10$^{-11}$ A$_{10}$: 0.140836 × 10$^{-14}$
r$_{10}$: aspherical surface
k: 0.0000
A$_4$: −0.273433 × 10$^{-5}$
A$_6$: −0.696690 × 10$^{-9}$
A$_8$: 0.169059 × 10$^{-11}$
A$_{10}$: −0.969289 × 10$^{-15}$

A$_{10}$: 0.1802828 × 10$^{-14}$

Figure 9:
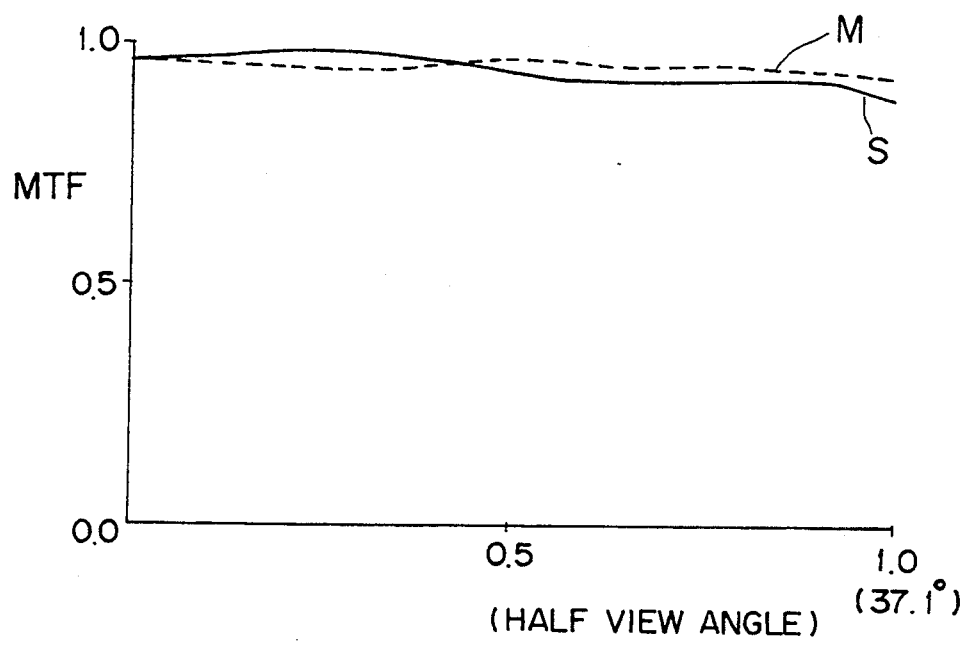
FIG. 9 is a graph of the MTF of experiment example 3.
Figure 10:
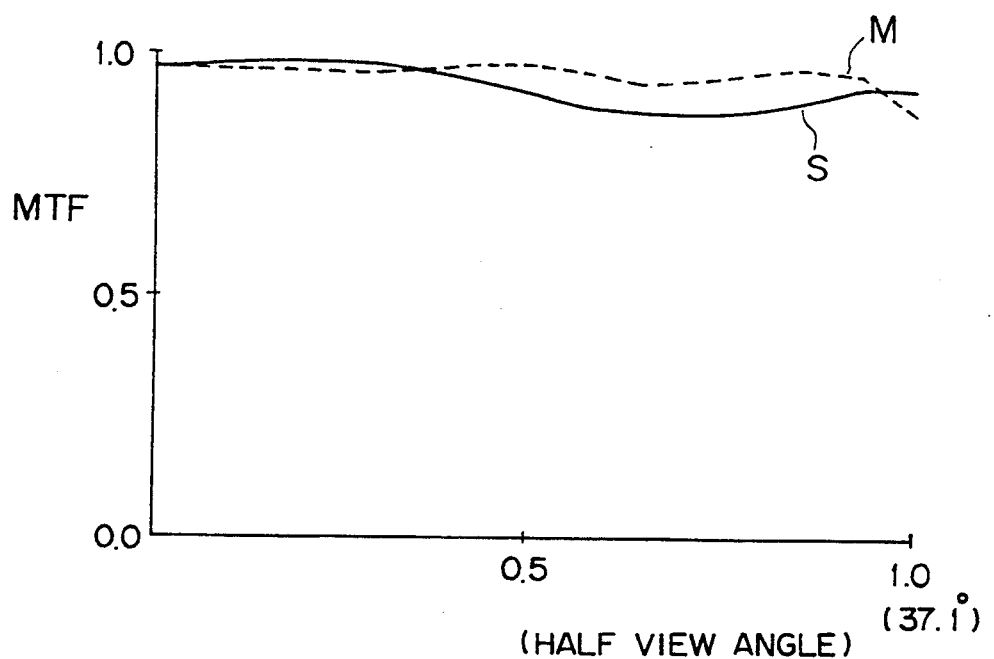
FIG. 10 is a graph of the MTF of experiment example 3 with respect to temperature change.

The MTF (Modulation Transfer Function) with respect to the monochromatic light is shown in FIG. 9, and the MTF obtained when the environmental temperature is increased by 20° is shown in FIG. 10. In these figures, meridional (M) is indicated by the broken line, and sagittal (S) is indicated by the solid line.

Next, calculation results of the Seidel's aberrations calculated on the basis of the above experiment examples 1–3 will be represented in Tables 1–3. The Seidel's aberrations are values of third order term which is calculated as the approximate values including series of sine function within third order term. From the aberration values shown in the Tables 1–3, characteristics and functions of the respective lenses are roughly understandable.

In the following tables, R$_1$ to R$_{12}$ indicate the surfaces of each lens.

TABLE 1

| Lens Group | Lens Surface | Spherical Abberation | Coma Abberation | Astigmatism | Petzval's Sum | Distortion | Lateral Chromatic Abberation | Transverse Chromatic Abberation |
|---|---|---|---|---|---|---|---|---|
| 1st | R$_1$ | 0.514 | 0.257 | 0.129 | 0.371 | 0.250 | −0.003 | −0.001 |
|  | R$_2$ | 0.001 | 0.007 | 0.048 | −0.134 | −0.567 | 0.000 | 0.002 |
| 2nd | R$_3$ | −0.969 | 0.716 | −0.529 | −0.448 | 0.722 | 0.004 | −0.003 |
|  | R$_4$ | 0.256 | −0.265 | 0.275 | 0.323 | −0.620 | −0.002 | 0.002 |
| 3rd | R$_5$ | 0.130 | 0.159 | 0.194 | 0.343 | 0.656 | −0.002 | −0.002 |
|  | R$_6$ | 0.938 | −0.546 | 0.318 | 0.207 | −0.306 | −0.003 | 0.001 |
| 4th | R$_7$ | −0.309 | 0.274 | −0.243 | −0.060 | 0.268 | 0.001 | −0.001 |
|  | R$_8$ | 1.013 | −0.220 | 0.048 | 0.277 | −0.071 | −0.001 | 0.000 |
| 5th | R$_9$ | −0.248 | −0.117 | −0.055 | −0.575 | −0.297 | 0.001 | 0.000 |
|  | R$_{10}$ | 0.010 | 0.005 | 0.002 | 0.040 | 0.020 | 0.000 | 0.000 |
|  | R$_{12}$ | −0.005 | 0.008 | −0.013 | 0.000 | 0.020 | 0.000 | 0.000 |
| Sum |  | 1.330 | 0.278 | 0.173 | 0.346 | 0.076 | −0.004 | −0.001 |

The above values are calculated under following conditions:

Distance d$_0$ = −598.74801 [mm]

Entrance Pupil = 71.749 [mm]

wherein the distance d$_0$ = (distance between the screen and the first group-lens) + 50 [mm].

TABLE 2

| Lens Group | Lens Surface | Spherical Abberation | Coma Abberation | Astigmatism | Petzval's Sum | Distortion | Lateral Chromatic Abberation | Transverse Chromatic Abberation |
|---|---|---|---|---|---|---|---|---|
| 1st | R$_1$ | 0.450 | 0.239 | 0.126 | 0.354 | 0.254 | −0.003 | −0.001 |
|  | R$_2$ | 0.001 | 0.006 | 0.033 | −0.134 | −0.559 | 0.000 | 0.002 |
| 2nd | R$_3$ | −0.765 | 0.600 | −0.471 | −0.419 | 0.698 | 0.003 | −0.003 |
|  | R$_4$ | 0.268 | −0.273 | 0.278 | 0.322 | −0.612 | −0.002 | 0.002 |
| 3rd | R$_5$ | 0.111 | 0.141 | 0.180 | 0.336 | 0.659 | −0.002 | −0.002 |
|  | R$_6$ | 1.043 | −0.571 | 0.313 | 0.222 | −0.293 | −0.003 | 0.001 |
| 4th | R$_7$ | −0.419 | 0.304 | −0.221 | −0.109 | 0.240 | 0.002 | −0.001 |
|  | R$_8$ | 1.135 | −0.212 | 0.039 | 0.308 | −0.065 | −0.001 | 0.000 |
| 5th | R$_9$ | −0.260 | −0.115 | −0.051 | −0.567 | −0.274 | 0.001 | 0.000 |
|  | R$_{10}$ | 0.012 | 0.006 | 0.003 | 0.042 | 0.023 | 0.000 | 0.000 |
|  | R$_{12}$ | −0.005 | 0.008 | −0.013 | 0.000 | 0.021 | 0.000 | 0.000 |
| Sum |  | 1.569 | 0.133 | 0.218 | 0.356 | −0.091 | −0.004 | −0.001 |

The above values are calculated under following conditions:

Distance d$_0$ = −598.69720 [mm]

Entrance Pupil = 72.430 [mm].

TABLE 3

| Lens Group | Lens Surface | Spherical Abberation | Coma Abberation | Astigmatism | Petzval's Sum | Distortion | Lateral Chromatic Abberation | Transverse Chromatic Abberation |
|---|---|---|---|---|---|---|---|---|
| 1st | R$_1$ | 0.243 | 0.177 | 0.128 | 0.281 | 0.298 | −0.002 | −0.002 |
|  | R$_2$ | −0.001 | −0.002 | −0.008 | −0.121 | −0.528 | 0.001 | 0.002 |
| 2nd | R$_3$ | −0.274 | 0.289 | −0.304 | −0.306 | 0.642 | 0.002 | −0.002 |
|  | R$_4$ | 0.036 | −0.066 | 0.121 | 0.198 | −0.583 | −0.001 | 0.002 |
| 3rd | R$_5$ | 0.178 | 0.207 | 0.240 | 0.336 | 0.669 | −0.002 | −0.002 |
|  | R$_6$ | 1.143 | −0.628 | 0.345 | 0.242 | −0.322 | −0.003 | 0.002 |
| 4th | R$_7$ | −0.562 | 0.341 | −0.207 | −0.161 | 0.224 | 0.002 | −0.001 |
|  | R$_8$ | 1.516 | −0.249 | 0.041 | 0.350 | −0.064 | −0.001 | 0.000 |
| 5th | R$_9$ | −0.229 | −0.084 | −0.031 | −0.507 | −0.198 | 0.001 | 0.000 |

TABLE 3-continued

| Lens Group | Lens Surface | Spherical Abberation | Coma Abberation | Astigmatism | Petzval's Sum | Distortion | Lateral Chromatic Abberation | Transverse Chromatic Abberation |
|---|---|---|---|---|---|---|---|---|
| | $R_{10}$ | 0.011 | 0.006 | 0.004 | 0.041 | 0.026 | 0.000 | 0.000 |
| | $R_{12}$ | −0.005 | 0.008 | −0.012 | 0.000 | 0.018 | 0.000 | 0.000 |
| Sum | | 2.057 | −0.001 | 0.316 | 0.353 | 0.180 | −0.004 | −0.001 |

The above values are calculated under following conditions:

Distance $d_0 = -595.29081$ [mm]

Entrance Pupil = 72.454 [mm].

As is seen from the Tables 1–3, the first-group lens mainly compensates for distortion and the second-group lens compensates for spherical aberration, coma aberration and astigmatism. The screen-side surface and CRT-side surface of the third-group lens are not symmetric, and hence the CRT-side surface thereof mainly increases spherical aberration and coma aberration while the screen-side surface thereof mainly increases distortion. The fourth-group lens provided mainly for improving imaging performance in the peripheral part and increases spherical aberration in paraxial characteristic. However, the fourth-group lens cancels coma-aberrations of both screen-side surface and the CRT-side surface with each other, and further compensates for distortion. The five-group lens mainly functions to make Petzval's sum close to zero, and also functions to compensates for distortion.

As is seen from FIGS. 3, 4, 6, 7, 9 and 10, it is confirmed that the projection lens according to the present invention has an aperture ratio 1.0 nevertheless it has excellent performance in which not only the aberrations but also variations in the refractive index of the plastic lens due to temperature change are compensated for even at a large half view angle of 37° or greater.

According to the present invention having the above-mentioned structure, it is possible to provide a high-performance projection lens which has a large view angle and high image forming performance and is little degraded due to temperature variation and which can be suitably applied to projection television sets having a half view angle of 34° or greater. Hence, thinning and down-sizing of projection television sets can be achieved. Due to a large view angle and high image forming performance, the present invention is suitable for a high vision image having an aspect ratio of the screen, such as 9:16 and contributes to down-sizing: Further, the lens-barrel can be diminished and the lenses can accurately be fixed in the mass production process because limitations are given regarding the on-axis interval $d_4$ between the second-group lens and the third-group lens as well as the ratio $d_4/f_0$ of the on-axis interval $d_4$ to the focal distance $f_0$ of the overall system.

It is to be noted that the object of the present invention can be achieved when one of the above conditions (a)–(f) is satisfied.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A projection lens comprising:
    a first-group lens, a second-group lens, a third-group lens, a fourth-group lens and a fifth-group lens arranged in this order from a screen side,
    the first-group lens including a positive lens, the second-group lens including a negative lens, the third-group lens including a positive lens, a fourth-group lens including a positive lens, and the fifth-group lens including a negative lens,
    each of the first-group lens and the second-group lens having an aspherical lens surface, one of the third-group lens and the fourth-group lens being an aspherical lens, and the negative lens of the fifth-group lens having a concave surface oriented to the screen side,
    the projection lens having a half view angle equal to or greater than 34° and satisfying the following conditions (a)–(f):
    (a) $0.04 < d_4/f_0 < 0.08$
    (b) $0.2 < \phi_1 < 0.9$
    (c) $-0.6 < \phi_2 < 0$
    (d) $0.7 < \phi_3 < 1.0$
    (e) $0 < \phi_4 < 0.5$
    (f) $-1.36 < \phi_5 < -0.6$
    where:
    $f_0$: focal distance of the overall system
    $d_4$: on-axis interval between the second-group lens and the third-group lens
    $\phi_1$: power of the first-group lens
    $\phi_2$: power of the second-group lens
    $\phi_3$: power of the third-group lens
    $\phi_4$: power of the fourth-group lens
    $\phi_5$: power of the fifth-group lens
    (where $\phi_1$–$\phi_5$ are values obtained when an optical power of an overall system is set to 1).

2. A projection lens according to claim 1, wherein a ratio $(dN/dT)_1$ of a refractive index N of the first-group lens to temperature and a ratio $(dN/dT)_2$ of a refractive index N of the second-group lens to temperature satisfy the following conditions:

$$(dN/dT)_1 < -1.0 \times 10^{-4}$$

$$(dN/dT)_2 < -1.0 \times 10^{-4}.$$

3. A projection lens according to claim 1, wherein the Abbe's number $\nu_1$ of the first-group lens, the Abbe's number $\nu_2$ of the second-group lens and the Abbe's number $\nu_3$ of the third-group lens satisfy the following conditions:

$$\nu_2 < \nu_1 \text{ and } \nu_2 < \nu_3.$$

4. A projection lens according to claim 1, wherein the fifth-group lens comprises a spherical lens made of glass or plastic.

5. A projection lens according to claim 1, wherein the fifth-group lens comprises a lens having at least one aspherical surface.

6. A projection lens according to claim 1, wherein said projection lens is used in combination with a CRT projection tube, and the CRT projection tube comprises a convex fluorescent surface.

7. A projection lens for use in combination with a cathode ray tube positioned closely adjacent to the faceplate of said cathode ray tube, said projection lens comprising a first-group lens, a second-group lens, a third-group lens, a fourth-group lens and a fifth-group lens in this order from a screen side, the first-group lens including a meniscus shaped element of positive optical power at the optical axis of said projection lens, the second-group lens including a meniscus shaped element of negative optical power for correcting most of spherical aberration, astigmatism and coma-aberration depending on aperture of the projection lens, at least one surface of the second-group lens being aspherical surface, the first-group lens and the second group lens cooperatively cancelling variations in refractive indexes of the first and second-group lens, the third-group lens including a biconvex element for supplying the majority of the positive optical power of the projection lens, the fourth-group lens including a meniscus shaped element of positive optical power for mainly correcting coma-aberration in a peripheral portion of the projection lens, the fifth-group lens including a meniscus shaped concave lens having concave surface oriented to the screen side, the fifth-group lens decreasing Petzval's sum to correct a curvature of field in cooperation with the second-group lens, the projection lens having a half view angle equal to or greater than 34° and satisfying the condition of:

(a) $0.04 < d_4/f_0 < 0.08$ where:

$f_0$: focal distance of the overall system $d_4$: on-axis interval between the second-group lens and the third-group lens.

8. A projection lens according to claim 7, wherein a liquid for emitting or absorbing heat of the cathode ray tube is filled between the fifth-group lens and the cathode ray tube.

9. A projection lens according to claim 7, wherein the cathode ray tube comprises a flat surface and a convex fluorescent surface.

10. A projection lens according to claim 7, wherein the projection lens further satisfies the following conditions (b)–(f):

(b) $0.2 < \phi_1 < 0.9$
(c) $-0.6 < \phi_2 < 0$
(d) $0.7 < \phi_3 < 1.0$
(e) $0 < \phi_4 < 0.5$
(f) $-1.36 < \phi_5 < -0.6$ where:

$\phi_1$: power of the first-group lens
$\phi_2$: power of the second-group lens
$\phi_3$: power of the third-group lens
$\phi_4$: power of the fourth-group lens
$\phi_5$: power of the fifth-group lens (where $\phi_1$–$\phi_5$ are values obtained when an optical power of an overall system is set to 1).

11. A projection lens according to claim 7, wherein a ratio $(dN/dT)_1$ of a refractive index N of the first-group lens to temperature and a ratio $(dN/dT)_2$ of a refractive index N of the second-group lens to temperature satisfy the following conditions:

$$(dN/dT)_1 < -1.0 \times 10^{-4}$$

$$(dN/dT)_2 < -1.0 \times 10^{-4}.$$

12. A projection lens according to claim 7 wherein each of the first-group lens and the second group-lens includes a flange portion and the first-group lens and the second group-lens are coupled with each other by said flange portions.

* * * * *